Feb. 5, 1952     D. W. DUNIPACE     2,584,851

METHOD AND APPARATUS FOR CUTTING AND BREAKING GLASS

Filed May 23, 1946

INVENTOR
Donald W. Dunipace
BY
Nobbe and Droope
ATTORNEYS

Patented Feb. 5, 1952

2,584,851

UNITED STATES PATENT OFFICE 2,584,851

METHOD AND APPARATUS FOR CUTTING AND BREAKING GLASS

Donald W. Dunipace, Perrysburg, Ohio, assignor to Libbey-Owens-Ford Glass Company, Toledo, Ohio, a corporation of Ohio Application May 23, 1946, Serial No. 671,799

9 Claims. (Cl. 49—50)

1

The present invention relates to glass cutting, and more particularly to the running of cuts or scores on relatively thick plates of glass.

In cutting sheet or plate glass of ordinary thicknesses, say from $\frac{1}{16}$ to $\frac{5}{8}$ of an inch, it is customary to first score the glass with a steel wheel or diamond point cutter along a line where the break is desired, and to then manually flex the salvage edge to snap it off along the scored line.

However, certain special glass products such as structural glass panels, optical prism blanks, port lights, and so forth, have to be cut from heavier, thicker plates. For example, as a step in the making of tank periscope prisms by the Libbey-Owens-Ford Glass Company during the late war, it was necessary to cut thousands of sheets of plate glass of thicknesses varying from $1\frac{1}{8}$ to $1\frac{1}{4}$ inches into 36-inch strips that were 4 inches or less in width.

To cut glass of such thickness into shapes or strips of this kind presents much more difficult problems than are encountered in ordinary glass cutting and, when shapes of regular or irregular, curved outline have to be cut from relatively heavy plates, the difficulties become still more pronounced, even when the plates are of considerably less thickness.

Now it has already been proposed to run cuts on thick glass by the application of heat along the score line, in lieu of the conventional flexing or tapping treatments, and specifically to use an electrically heated wire for the purpose. However, this method of splitting heavy glass, as heretofore practiced, has proved to be slow and unreliable, with the split often failing to follow the line of score, even on straight line cuts. With curved cuts, as in cutting port lights from thick sheets, the results were even less predictable, and in fact these circular types of cut ordinarily could not be run at all by the usual hot wire treatment.

It is an aim of the present invention to provide an improved kind of heating technique for use in running cuts on thick glass sheets, that is faster and more accurate than prior known methods, and that will give consistently true, clean breaks along either straight or curved score lines, on glass plates of any reasonable thickness.

Briefly stated, this is accomplished by the use of an interval type of heating; that is, by heating the glass at spaced intervals, instead of continuously, along the length of the score line. When

2 this is done, in the manner to be more fully hereinafter set forth, clean, accurate breaks can be quickly run along, and made to follow exactly, a score line of practically any pattern.

Another object of the invention is the provision of heating or electrical resistance elements of special shape and structure for carrying out the interval heating described above.

Still another object is to provide a complete method and apparatus of the above general character that is simple, convenient, and efficient; and that will permit shapes of any outline to be cut and broken out with unusual speed and accuracy from block size plates of minimum dimensions.

Other objects and advantages of the invention will become more apparent during the course of the following description, when taken in connection with the accompanying drawings.

In the drawings, wherein like numerals are employed to designate like parts throughout the same:

As has already been indicated, the method and apparatus of this invention can be used to run cuts of practically any pattern. However, because circular cuts have heretofore been considered the most difficult to make in heavy glass, the invention will be specifically described in that connection here.

Figure 2:
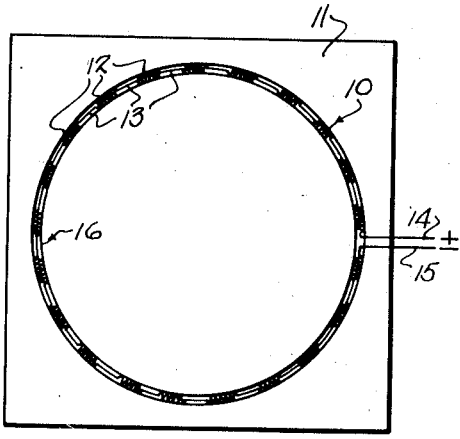
Fig. 2 is a plan view of a preferred form of heating element and mounting, constructed in accordance with the invention.
Figure 3:
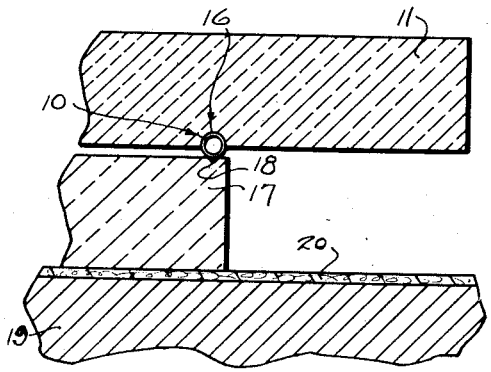
Fig. 3 is a fragmentary sectional view showing the scored block size plate of Fig. 1 on a cutting table with the apparatus of Fig. 2 in position to run the cut.
Figure 4:
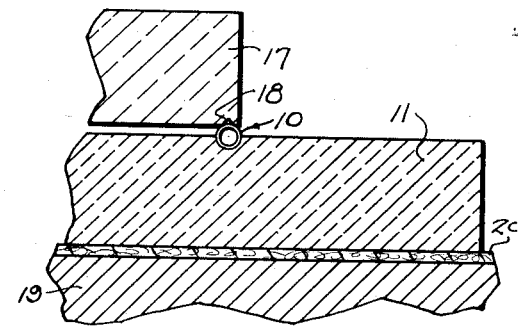
Fig. 4 is a view similar to Fig. 3 but with the plate of glass to be cut positioned above the heating element.

Referring now more particularly to the drawings, the apparatus illustrated in Figs. 2 to 4, for running circular cuts in thick glass, comprises an electrical resistance element 10 mounted in one face of an insulating board 11. As shown, the element 10 is of #19 coiled resistance wire, with coils 0.193 inch in diameter. But, in accordance with the invention, the coil is an intermittent, and not a continuous one.

In other words, instead of the wire being coiled continuously throughout its length, the element 10 is made up of a plurality of coiled portions 12 joined to one another by lengths of straight wire 13. Also, the resistance element terminates at its opposite ends in lengths of straight wire 14 and 15 which provide leads to be connected in any suitable manner with a source of electrical energy; for example, a 110 volt utility line. It is also desirable to connect the lead-out wires 14 and 15 to the power supply through a Variac voltage regulator so that the temperature of the element 10 can be adjusted to meet various conditions.

The purpose of the board 11 is to provide an easily handled mounting for the resistance element 10, and also to direct and concentrate the heat which the element develops. Consequently, the board should be of convenient size, and may be made of any suitable insulating material. A semicylindrical groove 16 is cut in a circular path in one face of the board to receive the heating element 10. The cross sectional diameter of the groove 16 is approximately the same as the diameter of the coiled portions 12 of the resistance element, and the diameter of the groove's circular path should be the same as the diameter of the score pattern with which the apparatus is to be used in cutting circular shapes from glass plates.

With this arrangement, the upper half of the resistance element 10 will fit into the groove 16, and can be anchored to the board 11 in any suitable manner, while the lower half of the coiled portions 12 will extend outwardly of the face of the board 11 for direct contact with a scored line on the surface of a glass plate to be cut.

Figure 1:
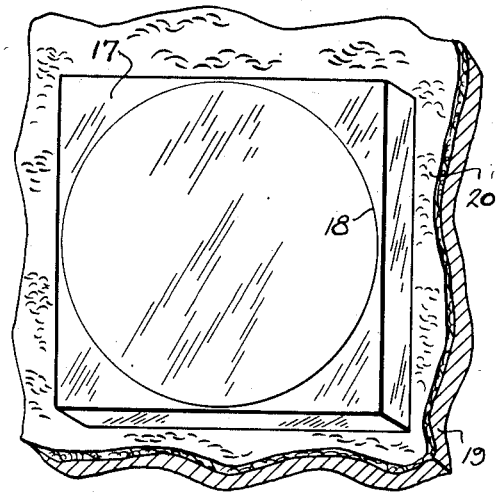
Fig. 1 is a perspective plan view of a block size of heavy plate glass scored for a circular cut.

The operation of the device is illustrated quite clearly in the drawings. A block size 17 of thick glass, from which it is desired to cut out a circle, is first scored in the usual manner with a diamond or wheel cutter as shown at 18 in Fig. 1. The glass plate in block size is usually scored while lying on a suitable cutting table 19, provided with a padded surface 20; and, as soon as the scoring operation is completed the score may be run either by placing the heating unit of Fig. 2 on the glass, as shown in Fig. 3, or by laying the glass on the heating device as shown in Fig. 4.

In either event, the coiled portions 12 of the element 10 are placed directly against the glass and in vertical alignment with the score line at all points of contact. When the procedure illustrated in Fig. 3 is followed, the heating unit may be inverted and positioned on the scored sheet while the latter is still resting on the cutting table 19. With the arrangement shown in Fig. 4, on the other hand, the heating device is laid with the resistance element uppermost and the scored. block size plate is placed thereon with its score line against the coiled portions of the wire.

With the glass plate to be cut and the heating unit arranged in proper relationship, and the electrical current turned on, the speed of fracture of the glass along the line of score will depend on a number of factors. For instance; the temperature of the glass and the wire, distance between coils, kind of score, and breaking characteristics of the glass itself. In actual practice, however, complete breaks of good quality are made in from 10 to 60 seconds in ¾ inch or thicker glass when the temperature of the wire is such that the coils are a very dull red in color. To remove the circle from the block size after the "cut has been run" requires only a straight score out from the circle, the collar of salvage glass falling away at once, leaving the completely cut out port light or other circular shape.

The theory behind my method of cutting heavy glass is that in all cases where a cut is run by heat, the break results from the non-uniform temperature variation that is set up between heated and unheated portions of the glass sheet. In this way some part of the glass body is placed in breaking tension and the break starts from that point.

In the prior art methods, where the score line was heated all along its length, the temperature differential was between the heated, scored surface of the sheet and its opposite unheated surface. As a result the breaking tension was set up between the two surfaces, or inside the glass sheet. Consequently, the break came from the inside out, and this accounts for its frequent failure to follow the score line.

With the interval heating method of this invention, on the other hand, the temperature differential occurs at frequent and successive intervals all along the score line and right at the surface of the glass sheet. Or, differently expressed, spaced areas of glass throughout the length of the score line are put under compression by the heat, while at the same time the unheated area between each of these compression areas is in tension. The result is that breaks start simultaneously in a whole series of tension areas that are distributed uniformly from one end to the other of the line of score. Since the break starts at the surface of the glass, it follows the score line accurately, and the multiplicity of closely spaced starting breaks quickly unite to give a smooth, continuous and controlled fracture.

The use of a Variac or other control means, as suggested above, between the heating wire and the source of power is extremely desirable in running either straight or curving cuts in the manner outlined above because, for every set of conditions, that is, coil and interval length, glass thickness, etc., there is an ideal temperature of wire to give the best results. By the use of proper control devices the best temperature for a given set of other conditions can be readily arrived at as will presently be shown.

In running straight cuts, from side to side of a glass plate, for example, the length of coil and length of interval in the heating wire is important only to the extent that certain lengths will be found to give the greatest efficiency for certain thicknesses of glass. However, in running circular cuts, the length of the coils and the length of the intervals in the heating wire assume much more importance. In fact, when coils or intervals that are either too long or too short are used, the cut may not run at all; or, if it does run, it will be poor and inaccurate.

In arriving at the proper length of coil and length interval to be used in any given situation, there appears to be a very definite relationship between the thickness of the glass being cut and the lengths of coil and interval in the wire used to run the cut. For obvious reasons, no exact proportion of coil and interval length, to glass thickness, that will give the optimum results in all situations can be given. However, as a general proposition, I have found that in most cases a heating wire having a coil length and an interval length that are each roughly equal to the thickness of the glass being cut will prove most satisfactory.

To illustrate, there is listed below the results obtained in cutting 14½-inch diameter discs from 15½-inch square block sizes of ¾ inch thick glass. The letters A, B, C, and D, used in the table to denote quality of cut, are to be read as follows: "A" excellent, "B" good, "C" fair, etc.

| Variac Voltage | Ammeter | Wattage | Interval in Inches | Coil in Inches | Time in Seconds | Quality |
|---|---|---|---|---|---|---|
| SECTION A | | | | | | |
| 100 | 8.5 | 850 | −1 | 1− | 20 | D |
| 90 | 7.8 | 702 | −1 | 1− | 25 | D |
| 80 | 7.0 | 560 | −1 | 1− | 35 | D |
| 70 | 6.3 | 441 | −1 | 1− | 50 | C |
| 65 | 5.9 | 384 | −1 | 1− | 75 | B |
| 60 | 5.5 | 330 | −1 | 1− | 100 | B |
| 50 | 4.8 | 240 | −1 | 1− | 150 | B |
| 45 | 4.4 | 198 | −1 | 1− | 190 | B |
| 40 | 4.0 | 160 | −1 | 1− | 300 | C |
| SECTION B | | | | | | |
| 90 | 7.0 | 630 | −¾ | ¾− | 27 | D |
| 80 | 6.4 | 512 | −¾ | ¾− | 33 | D |
| 70 | 5.7 | 399 | −¾ | ¾− | 37 | A |
| 68 | 5.5 | 374 | −¾ | ¾− | 35 | A |
| 65 | 5.3 | 344 | −¾ | ¾− | 38 | A |
| 62 | 5.1 | 317 | −¾ | ¾− | 43 | A |
| 60 | 5.0 | 300 | −¾ | ¾− | 84 | A |
| 58 | 4.9 | 284 | −¾ | ¾− | 171 | B |
| 56 | 4.7 | 263 | −¾ | ¾− | 177 | B |
| 54 | 4.5 | 243 | −¾ | ¾− | 200 | C |
| 52 | 4.4 | 229 | −¾ | ¾− | 150 | C |
| 50 | 4.2 | 210 | −¾ | ¾− | 192 | C |
| SECTION C[1] | | | | | | |
| 87 | 8.5 | 740 | −¾ | ½− | 20 | C |
| 77 | 7.4 | 495 | −¾ | ½− | 25 | C |
| 60 | 6.0 | 360 | −¾ | ½− | 40 | B |
| 56 | 5.7 | 320 | −¾ | ½− | 50 | A |
| 50 | 5.2 | 260 | −¾ | ½− | 127 | A |
| 52 | 5.0 | 260 | −¾ | ½− | 160 | B |
| 48 | 4.6 | 221 | −¾ | ½− | 232 | C |
| 46 | 4.4 | 202 | −¾ | ½− | 325 | D |
| SECTION D | | | | | | |
| 112 | 7.3 | 817 | −½ | ¾− | 15 | D |
| 90 | 6.0 | 540 | −½ | ¾− | 32 | B |
| 82 | 5.8 | 475 | −½ | ¾− | 40 | B |
| 78 | 5.4 | 422 | −½ | ¾− | 60 | A |
| 70 | 5.0 | 350 | −½ | ¾− | 70 | A |
| 64 | 4.6 | 294 | −½ | ¾− | 150 | B |
| SECTION E | | | | | | |
| 90 | 7.2 | 647 | −½ | ½− | 27 | D |
| 80 | 6.7 | 536 | −½ | ½− | 66 | B |
| 74 | 6.1 | 451 | −½ | ½− | 50 | A |
| 70 | 5.9 | 413 | −½ | ½− | 67 | A |
| 68 | 5.7 | 388 | −½ | ½− | 63 | A |
| 60 | 4.6 | 276 | −½ | ½− | 135 | A |
| 50 | 4.1 | 205 | −½ | ½− | 285 | C |
| SECTION F | | | | | | |
| 110 | 9.0 | 990 | −¼ | ¼− | (2) | (2) |
| 100 | 8.5 | 850 | −¼ | ¼− | (2) | (2) |
| 90 | 7.6 | 684 | −¼ | ¼− | (2) | (2) |
| 60 | 5.2 | 312 | −¼ | ¼− | (2) | (2) |

[1] This set-up exhibits smoothest joining of the multiple fractures.
[2] No Time or Quality Data can be given since no breaking occurred until glas was taken from contact with wire. The breaking was then violent enough to be called explosive.

From the above table it can be seen that for the ¾ inch glass used there, an interval and coil length around ¾ inch, and some proportion of interval to coil length between ½ : ½ and ¾ : ¾ will produce the best results. Thus, when I went to an interval-coil arrangement as short as ¼–¼ (Section F) the cut did not run at all. On the other hand, with an interval-coil length as long as 1″–1″ (Section A) the quality of break was not as good as with shorter lengths, and a longer time was required. The ¾ inch coil and ¾ inch interval (Section B) was the fastest without loss of quality. However, a ¾ inch interval with a ½″ coil (Section C) gave the smoothest cut faces.

One of the advantages of the present invention lies in the fact that in addition to the speed and quality of cut, circles can be satisfactorily cut from unusually small block sizes. For example, in commercial production good circular lights $12\frac{9}{16}$ in diameter have been cut from ¾ inch glass in block sizes 12⅝ inches by the method of this invention. Moreover, it was found, surprisingly enough, in connection with this same order, that when the block size used was only $\frac{1}{16}''$ over the desired circle size the quality of cut was considerably better than any block size up to approximately 1″ over circle size.

Heating units may be made, according to this invention, with other backings than the insulating board shown; or without any backing. The straight lengths of wire 13, forming the intervals between the coiled wire portions 12, may be insulated under some circumstances in order to give greater temperature differentials. Also, heating devices other than an electrical resistance element may be designed to provide an interval type of heating along a score line; and, where electrical resistance elements are used, they may be of flat as well as round wire, and may be looped rather than coiled to obtain the desired results.

In fact, it is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of cutting glass plates which comprises scoring the plate, and then applying heat to the same only at spaced intervals along said score line to run the cut.

2. The method of running a cut on a scored glass plate which comprises creating alternate hot and relatively cooler areas in the glass along the score line, the length of said areas as measured along the line of score being roughly equivalent to the thickness of the plate to be cut.

3. The method of running a cut on a scored glass plate which comprises creating alternate hot and relatively cooler areas in the glass along the score line, the length of said areas as measured along the line of score being roughly equivalent to the thickness of the plate to be cut, but with the hot areas being of slightly different length than the cooler areas.

4. The method of running a cut on a scored glass plate which comprises applying heat to said plate at spaced intervals only along the score line, with the length of the area to which heat is applied and of the space between said areas being roughly equivalent to the thickness of the sheet being cut.

5. The method of running a cut on a scored glass plate which comprises applying heat to said plate at spaced intervals only along the score line, with the length of the area to which heat is applied and of the space between said areas being roughly equivalent to the thickness of the sheet being cut, but with the areas to which heat is directly applied being slightly shorter than the spaces between these areas.

6. In apparatus for running a cut in a scored glass plate, an electrical resistance element comprising a series of spaced coiled wire sections arranged in substantially end to end relation, and a series of straight wire sections running between and connecting the coiled wire sections.

7. Apparatus for running cuts in scored glass plates, comprising an electrical resistance element made up with a series of spaced coiled wire sections connected together by a series of straight wire sections extending therebetween, and an insulating backing for receiving and supporting said heating element with a part of the coiled wire sections extending beyond the face of said backing.

8. The method of running a cut on a scored glass plate which comprises heating said plate at spaced intervals along the score line to set up alternate tension areas and compression areas at the surface of the glass along the score line sufficient to start a series of breaks from the scored surface of the plate at said tension areas along the score line.

9. The method of cutting glass plates which comprises scoring the plate, and then applying a medium having a temperature different than the temperature of the glass to the scored surface only at spaced intervals along said score line to run the cut.

DONALD W. DUNIPACE.

REFERENCES CITED

The following references are of record in the file of this patent:

UNITED STATES PATENTS

| Number | Name | Date |
| --- | --- | --- |
| 1,289,510 | Miller | Dec. 31, 1918 |
| 2,022,466 | Hess | Nov. 26, 1935 |
| 2,116,129 | Stringer | May 3, 1938 |
| 2,125,922 | Hopfield | Aug. 9, 1938 |
| 2,169,687 | Fowler et al. | Aug. 15, 1939 |
| 2,247,118 | Drake | June 24, 1941 |
| 2,258,692 | Turke | Oct. 14, 1941 |
| 2,282,440 | Turke | May 12, 1942 |

FOREIGN PATENTS

| Number | Country | Date |
| --- | --- | --- |
| 17,776 | Norway | Oct. 30, 1907 |